Feb. 2, 1932.   A. PIEPKORN   1,843,695
TRANSMISSION OF POWER
Filed June 7, 1930
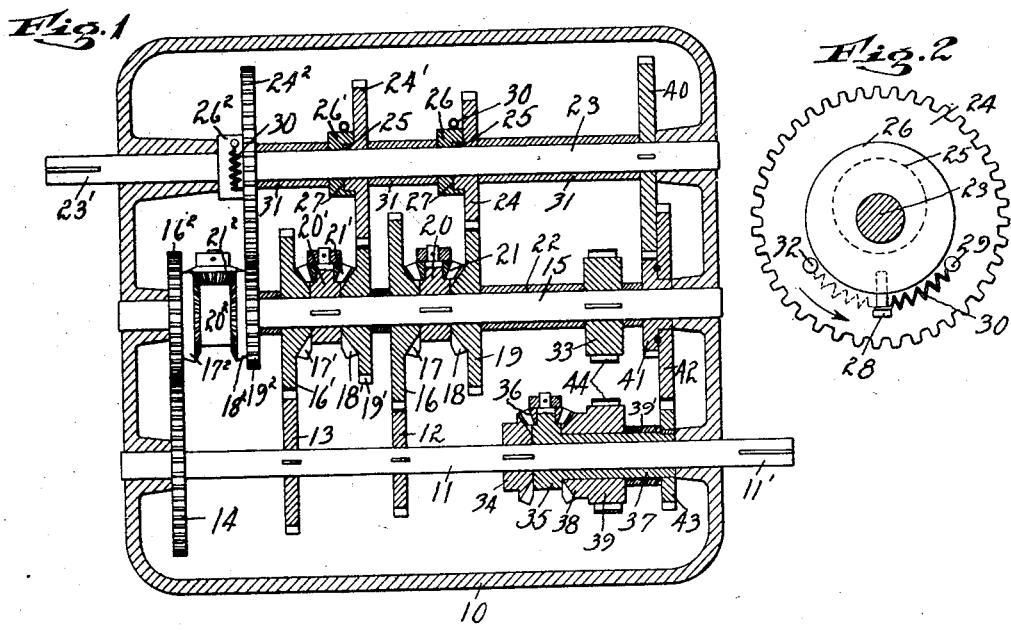
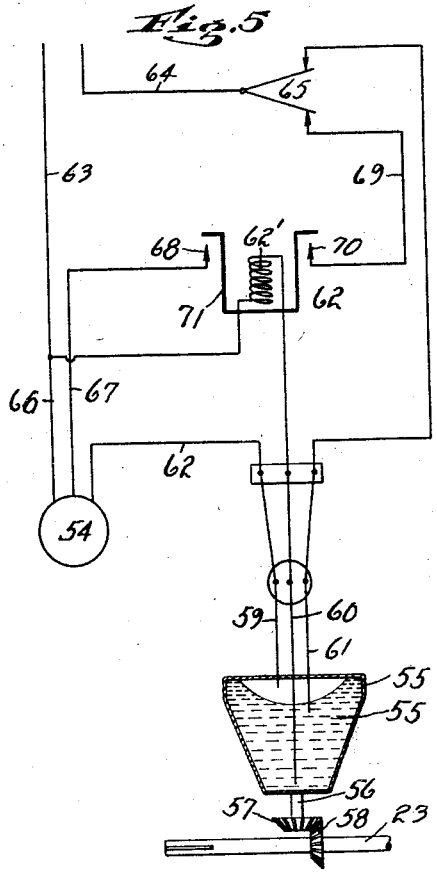
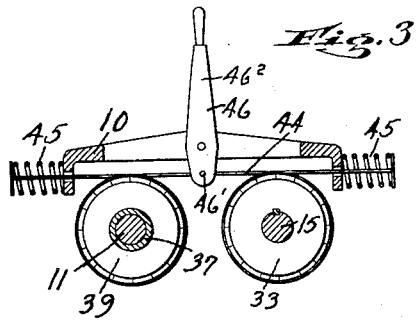
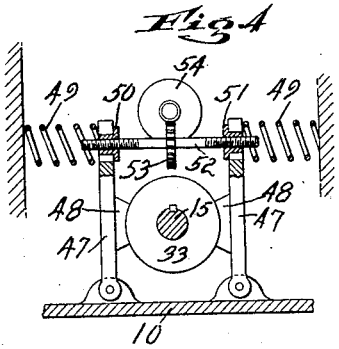
INVENTOR.
Arthur Piepkorn
BY Max D. Ordmann
ATTORNEYS.

Patented Feb. 2, 1932

1,843,695

UNITED STATES PATENT OFFICE

ARTHUR PIEPKORN, OF BROOKLYN, NEW YORK

TRANSMISSION OF POWER

Application filed June 7, 1930. Serial No. 459,628.

The present invention relates to variable speed power transmission gearing for use on motor vehicles in place of standard gear shifting arrangements now employed, or in other machinery drives.

One of the primary objects of the present invention is the provision of a device whereby power may be transmitted from a shaft of given speed to an output shaft having a variable speed and whose speed may be made to vary in a gradual continuous manner whereby said shaft may be gradually and continuously accelerated or retarded within desired limits.

In providing a device of this sort I am, of course, aware that there are devices which have been proposed for accomplishing this result. The known devices however are very complex and expensive.

In my copending application Ser. No. 379,-909, filed July 22, 1929, I have described one effective way of accomplishing my desired object. The present embodiment is an improvement over the earlier device wherein I have greatly simplified the structure without in any way impairing the effectiveness of the results obtained.

A further object therefore, of the present invention is the production of a simplified structure for carrying out my first named object.

Still another object is the provision of a device which may be commercially produced at comparatively low cost.

Yet another object is the provision of a device which may be applicable to different types of motor vehicles.

Another object is the provision of a device which may be employed for machinery drives to produce determined speeds at varying loads.

With the above and other objects in view my invention comprises the novel construction, combination and arrangement of elements to be hereinafter more fully described, shown and defined in the appended claims.

A clearer understanding of my invention may be had by reference to the accompanying drawings which form part of this specification, in which similar reference characters denote corresponding parts and in which:

Fig. 1 is a sectional elevation of my device;
Fig. 2 is an elevational view of a detail;
Fig. 3 is a sectional elevation of one form of brake to be employed with the device of Fig. 1;
Fig. 4 is a sectional elevation of an electrically controlled brake for use with the device of Fig. 1; and
Fig. 5 is a diagrammatic view of the governor and electrical circuit for controlling the device of Fig. 4.

Referring in detail to the said drawings, 10 denotes a housing in which a rotatable shaft 11 is suitably journaled and which may extend outwardly beyond said housing as at 11' for suitable connection to an input source (not shown). Mounted on said shaft and adapted to rotate therewith as by being keyed thereto are several spur gears 12, 13, 14, suitably spaced from each other. As shown in the present embodiment, the diameters of the respective gears diminish in size from left gear to right gear. Any other suitable arrangement may be made however.

A second shaft 15 also rotatable, may be journaled to said housing and mounted on said shaft are a plurality of differential gearing systems corresponding in number to the number of gears on shaft 11. The said differential systems comprise the gears 16, 16' and $16^2$ which are rotatably mounted on said shaft 15 and whose diameters are correspondingly admeasured to permit them to mesh respectively with gears 12, 13 and 14. The gears 16, 16' and $16^2$ have integrally formed therewith or else fixedly attached to themselves the bevel gears 17, 17' and $17^2$ respectively. Also rotatably mounted on said shaft 15 and forming part of the said differential systems are bevel gears 18, 18' and $18^2$ respectively, spaced from the gears 17, 17' and $17^2$ and having the same diameter and number of teeth as the latter. Integrally formed with or fixedly attached to the said gears 18, 18' and $18^2$ are spur gears 19, 19' and $19^2$ shown in the present instant as progressively increasing in diameter from the left gear to right gear. Mounted between the respective pairs of gears 17—18, 17'—18'. 17²—18² on the said shaft 15 and adapted to rotate with the latter as by being keyed thereto or the like are collars 20, 20' and 20² to which are rotatably journaled bevel pinions 21, 21' and 21² respectively, which latter mesh respectively with the aforenamed pairs of gears. The said differential systems may be suitably spaced from each other by spacing collars 22.

A third shaft 23 also rotatably journaled in the housing 10 and having an extending portion 23' for coupling to the driven unit (not shown) is provided. Rotatably mounted to said shaft are gears 24, 24' and 24² which are so admeasured in diameter as to mesh respectively with gears 19, 19' and 19². Either fastened to or integrally formed with the gears 24, 24' and 24² are eccentrics 25. Rotatably mounted on the shaft 23 are collars 26, 26' and 26² which are each provided with eccentric recesses 27, respectively, the said recesses being adapted to loosely fit over the corresponding aforementioned eccentrics. Suitable pins 28 on the respective collars are provided and similarly pins 29 on the face of the gears 24, 24' and 24² may be provided whereby springs 30 may be mounted between the respective pairs of pins 28—29 on said collars and gears. Suitable spacing collars 31 between the respective gears and collars 26 may be employed.

The arrangement of eccentrics and collars above described form so called silent ratchet couplings of the respective gears 26, 26' and 26² to the shaft 23 which operate as follows:—

Without spring 30, gear 24 and collar 26 may rotate freely together on the shaft 23. The spring 30 however, has the tendency to rotate the collar relative to said gear, not however, about the center of the shaft, but about the center of the eccentric 25. Since the collar and gear are also on the shaft and have to remain centered thereon, a wedging of the gear and collar to the shaft occurs. Now if the gear 24 is rotated in the same direction as the spring 30 is tending to pull the collar 26, the wedging action will be amplified by the added force transmitted and the gear and collar will be positively locked on the shaft so that useful power may be delivered to said shaft. If however, the gear is rotated in opposite direction to the direction of pull of the spring, the transmitted force will diminish the wedging action on the shaft between said collar and gear and consequently allow the gear and collar to slip on the shaft. If desired the direction of drive of the shaft can be reversed by uncoupling the spring connection from pin 29 and coupling it to a pin 32 on the gear 24 on the opposite side of pin 28 which is on the collar. By so doing, power will be transmitted to the shaft only when the gear 24 is rotated in opposite direction to that shown by the arrow in Fig. 2. The necessity of the ratchet arrangement will presently be seen. Of course, if desired any conventional ratchet arrangement or the like may be employed in place of the silent ratchet to secure drive of shaft 23 in one direction only.

The shaft 15 has suitably mounted and keyed or otherwise fastened thereto a brake drum 33 for a purpose to be hereinafter specified which may be controlled by a suitable brake band.

The operation of the device may be described as follows:—

Assuming the input shaft 11 is run at constant speed from a power source (not shown) which may be an electric motor, the engine of an automobile or the like. Also assume that the brake is set to permit a definite speed of the shaft 15. Because of the meshing of gears 12, 13, and 14 with gears 16, 16' and 16² the speeds of the latter gears and also the speeds of pinions 20, 20' and 20² are determined. The gears 18, 18' and 18² however, while having their speeds determined also, have not equal speeds because of differing gear ratios. However, only the fastest running gear of the latter three will drive the shaft 23 and because of the ratchet arrangement on said latter shaft the other gears will merely slip. If now the brake shaft speed is readjusted, the speed of gears 18, 18' and 18² will also change and consequently the speed of the output shaft 23 will be changed. The change of speed of the respective gears with variation in brake shaft speed need not be uniform and it thus may occur that the gear of the three, to wit of gears 18, 18' and 18², which previously was the fastest running one, will now become the slowest, so that the drive will shift to one of the other of said three gears and consequently to one of the other of said differential sets. If the gear ratios are proportioned correctly the change should occur whenever the power consumed by the brake reaches a given maximum. It is thus seen that by providing a constant input speed it is possible by varying the speed of the braking shaft 15 to procure a wide variation of speed at the output shaft 23. The extent of variation and smoothness of operation can be greatly increased by the addition of further differential units on the shaft 15.

If my device is used as a drive for a motor vehicle it is of course essential to provide means for reversing the direction of rotation of the output shaft. In so doing it is not practically possible to reverse the direction of rotation of the input shaft and the ratchet mechanisms each time reverse drive is desired, and I therefore have provided the following reversing means.

Keyed to the input shaft 11 is a bevel gear 34 of a differential gearing system. Rotatably mounted on said shaft 11 is a support 35 to which is rotatably mounted a bevel gear 36 which latter meshes with the said gear 34. The support 35 has attached thereto or integrally formed therewith a sleeve like portion 37 concentric with the shaft 11 and rotatably mounted on the said sleeve like portion is a bevel gear 38 which also meshes with the gear 36 and which may have integrally formed with it or suitably fixed thereto a brake drum 39.

Keyed to the shaft 23 is a spur gear 40 which meshes with a spur gear 41 which latter is rotatably mounted to shaft 15. Suitably fixed to or integrally formed with gear 41 is a gear 42 which is adapted to mesh with a gear 43 which latter is keyed to the sleeve 37. A collar 39' may suitably space drum 39 from gear 43 and consequently hold gear 38 in mesh with gear 36.

The operation of this reversing means in conjunction with the other apparatus is readily seen. The brake drum 33 is released and the drum 39 is braked whereupon power is transmitted through the reversing differential to the gear 43 which latter through the gears 42, 41 and 40 transmits the power from the input shaft to the output shaft 23 causing the latter to rotate in reverse direction to the direction which the differential systems on shaft 15 would impart to the output shaft. Varying the braking action on drum 39 and consequently the speed of gear 38 in turn varies the speed of the output shaft 23.

There would be no tendency on the part of any of the differentials on shaft 15 to impart power to shaft 23 because the shaft 15 is free since brake drum 33 is released.

Other suitable reversing mechanisms may be employed of course.

To conveniently control the two brake drums 33 and 39 from a single point the following expedient may be employed. The said drums may be mounted in alignment on their respective shafts, and a single brake band 44 looped around both said drums as shown in Fig. 3. The ends of said band may be tensioned by springs 45. However, normally the said band is loose on both said drums. A double armed lever 46 suitably pivoted to a portion of the housing 10 has one arm thereof projecting into the housing and said arm engages the band 44 as at 46'. The other arm 46² projects upwardly from the housing and terminates in a handle. Now then drawing the arm 46² toward the right tightens the band 44 about the drum 33 causing direct drive of shaft 23 through the differentials on shaft 15. Suitable means (not shown) may be provided to hold the said arm in any desired position. The drawing of said arm to the right while tightening the band about drum 33 loosens the band about drum 39, still further.

Similarly by pushing the arm 46² to the left tensioning of the band 44 about drum 39 and corresponding loosening of said band about said drum 33 occurs. This causes reverse drive of shaft 23 through the differential on shaft 11.

When the arm 46 is in normal undisplaced position it is in so called neutral position and no drive of shaft 23 occurs since both brake drums are free.

Now then if the drive described above is used for machinery drive in a factory it may of course be unnecessary to include the reversing mechanism described. In using the device for the last named purpose it is of course highly desirable that a constant speed be given to the output shaft 23 irrespective of the load. To this end it is desirable to automatically control the braking action on the drum 33 and in place therefore of the band brake control hitherto described, the said brake drum may be controlled as follows:—

Pivotally mounted to the housing 10 or any other suitable point are two arms 47 having respectively braking surfaces 48 which latter engage the drum 33 and are tightly held against the said drum by means of springs 49 or the like which have sufficient power to firmly hold the drum 33 braked. The upper end of each of said arms may have formed therein or mounted thereon oppositely threaded nuts 50 and 51 respectively. A rotatable shaft 52 is provided, the ends of which are formed with oppositely cut threads to engage in the respective nuts 50 and 51. A suitable worm gear 53 may be provided on shaft 52 which may be driven by a reversible motor 54. Driving the motor in one direction tends to force the brake arms 47 away from the drum 33 and vice versa. Thereby tightening or loosening of the brake on drum 33 may be accomplished.

In order to control the action of the motor 54 an electrical governor may be employed. The said governor may comprise a mercury container 55 rotatably supported on a shaft 56 and adapted to be driven by means of a bevel gear 57 which meshes with a bevel gear 58 suitably fixed to the output shaft 23. The speed of rotation of said cup varies, therefore, in accordance with the speed of said output shaft and consequently the height of the mercury at and near the axial center of said rotating cup varies in accordance with the speed of the latter. The direction of drive of the said motor may now be controlled by the following means.

Three wires 59, 60 and 61 insulated from each other and of different lengths are adapted to project into the said cup and the height of the mercury in the said cup will determine which of said wires will be bridged therein.

Wire 59 which is the shortest of the said three wires may be connected to one of the outlet leads 62 of the motor 54. Wire 60 which is the longest of said three wires may be connected to coil 62′ of a circuit closing relay 62 the other end of which is connected to one of the current feed lines 63.

The wire 61 may be connected to the other feed line 64 through a distributing switch 65. The input lead 63 is also connected to the lead 66 from the motor and the third lead 67 from the said motor which may be the reversing lead is connected to a contact 68 of the relay 62. A wire 69 connects a second contact 70 on the said relay to the distributing switch 65. The relay 62 is provided with a bridging member 71 which latter bridges the contacts 68 and 70 when said coil 62′ is deenergized.

The operation of the governor control is as follows:—In the position shown, the speed of the output shaft is such that wires 60 and 61 only are bridged by the mercury 55′ in the cup. As a result the coil 62′ is actuated and consequently no current will flow into the motor 54. Now then assume that the driving shaft 23 slows down and the mercury also bridges the wire 59. As a result current will now flow through wire 62 into the motor drive thereby driving the motor in direction to tighten the brakes about the drum 33 and consequently causing the shaft 23 to speed up. As soon as the shaft 23 has speeded up sufficiently the circuit through wire 59 is broken by the mercury which again recedes to the position shown in Fig. 5. Should the shaft 23 acquire too great a speed, the mercury in cup 55 will recede to such a level as to break the bridge between wires 60 and 61 and consequently deenergize coil 62′ thereby permitting bridging member 71 to close the circuit through wire 67 and as a result causes motor 64 to be driven in reverse direction to loosen the braking on drum 33 and thereby slow down shaft 23. As soon as the shaft has slowed down to desired speed, wires 60 and 61 will again be bridged and stop driving of the motor.

It is thus seen that the speed of shaft 23 can be kept at any desired point or within any desired limits by the said governor. Should a new speed range be desired it is merely necessary to reset the level of the wires 59 and 60 and 61 in the said cup and/or with respect to themselves.

With my invention it is therefore possible to obtain either, variable speed at constant load or constant speed at variable load and/or variable speed and variable load with a fixed input speed of rotation and my device is therefore universal in its application. In motor vehicle drives of course variable input speeds are also attainable but of course at each different speed the same principles of operation hitherto described apply.

I am of course aware of the fact that many modifications of my above described device may be effected and I do not in any way wish to be limited to the details shown and described.

What I claim is:—

1. A device for transmitting power at accelerable and retardable speeds comprising an input shaft, an output shaft, an intermediate shaft, a plurality of differential gearing systems each comprising two gears of equal size, both meshing with a third gear, the latter gear capable of planetary motion, means for automatically coupling said input shaft to said output shaft through one of said differential systems and means for controlling the planetary motion of each of said third gears.

2. A device for transmitting power at accelerable and retardable speeds comprising an input shaft, an output shaft, an intermediate shaft, a plurality of differential gearing systems each comprising respectively two bevel gears rotatably mounted on said intermediate shaft and a third bevel gear adapted to mesh with said two first named gears and being rotatably mounted on a support which latter is adapted to rotate with said intermediate shaft, means for coupling said differential systems to said input and output shafts, means whereby said output shaft may be driven in one direction only by said differential systems and means for controlling the speed of said intermediate shaft.

3. A device for transmitting power at accelerable and retardable speeds comprising an input shaft, an output shaft, an intermediate shaft, a plurality of differential gearing systems on the last named shaft each comprising two gears of equal size both meshing with a third gear, the latter gear capable of planetary motion, means for coupling said input and output shafts to said intermediate shaft, means for controlling the planetary motion of each of said third gears and ratchet means whereby driving of said output shaft through said differential systems will shift from one to the other of the latter depending on the speed of said intermediate shaft, thereby controlling the speed of said output shaft.

4. A device for transmitting power at accelerable and retardable speeds from an input shaft to an output shaft, comprising a plurality of differential systems each consisting of two bevel gears both meshing with a third bevel gear, said latter gear making planetary motion, means for automatically coupling said input shaft to said output shaft through any one of said differential systems, means whereby driving of said output shaft will shift from one to the other of said differential systems depending on the planetary motion of said third named gears and means for regulating the planetary motion of said third named gears.

5. A device for transmitting power at accelerable and retardable speeds comprising an input shaft, an output shaft, a plurality of differential gearing systems, each comprising two gears of equal size, both meshing with a third gear, means for automatically coupling said input shaft to said output shaft through any one of said differential systems, means whereby driving of said output shaft through said differential systems will automatically shift from one to the other of said systems depending on the speed of elements of the latter and means for regulating the speed of said elements.

6. A device for transmitting power at accelerable and retardable speeds comprising an input shaft, an output shaft, a plurality of differential gearing systems, each comprising two gears of equal size both meshing with a third gear, means for automatically coupling said input shaft to said output shaft through any one of said differential systems, means whereby driving of said output shaft will automatically shift from one to the other of said systems depending on the speed of elements of said systems, means for regulating the speed of said elements and means for reversing the direction of drive of said output shaft.

7. A device for transmitting power at accelerable and retardable speeds comprising an input shaft, an output shaft, an intermediate shaft, a plurality of differential gearing systems mounted on said intermediate shaft, means for coupling said input and output shafts to said differential systems, means for controlling the speed of said intermediate shaft, means whereby the drive of said output shaft through said differential systems will shift from one to the other of said systems depending upon the speed of said intermediate shaft and means for reversing the direction of drive of said output shaft.

8. A device for transmitting power at accelerable and retardable speeds comprising an input shaft, an output shaft, an intermediate shaft, a plurality of differential gearing systems mounted on said intermediate shaft, means for automatically coupling said input shaft to said output shaft through any one of said differential gearing systems and braking means for controlling the speed of said intermediate shaft to control the speed of said output shaft.

9. In a device as per claim 1, in which said intermediate shaft speed controlling means includes a brake drum operatively connected to said intermediate shaft and automatically controlled means for regulating the braking of said drum.

10. A device for transmitting power at accelerable and retardable speeds comprising an input shaft, an output shaft, differential means coupling said two shafts, braking means for regulating said differential means and automatic control means for actuating said braking means, said automatic control means including a rotatable liquid, the surface variation of which with speed of rotation, is used to control an electrical circuit.

11. A device for transmitting power at accelerable and retardable speeds comprising an input shaft, an output shaft, differential means for coupling said two shafts and automatic means for controlling said differential means, said automatic means including a rotatable liquid, the surface variation of which with speed of rotation is used to control an electrical circuit.

12. In a device as per claim 5, in which said automatic shifting means includes silent ratchet means whereby said differential systems may drive said output shaft in one direction only.

13. A device for transmitting power at accelerable and retardable speeds, comprising an input shaft, an output shaft, an intermediate shaft, a plurality of differential systems each comprising respectively two bevel gears rotatably mounted on one of said shafts, and a third bevel gear adapted to mesh with said two first named gears and being rotatably mounted on a support which latter is adapted to rotate about the axis of said two first named bevel gears, means for operatively connecting said differential systems with the said shafts, whereby one of said systems at a time will transmit power to said output shaft, the particular one depending upon the speed of said intermediate shaft, and means for controlling the speed of said intermediate shaft.

In testimony whereof I affix my signature.

ARTHUR PIEPKORN.